(12) United States Patent
Naaman (10) Patent No.: US 9,247,393 B2
(45) Date of Patent: *Jan. 26, 2016

(54) DISABLING ACCESS POINT NOTIFICATIONS

(71) Applicant: Apple Inc., Cupertino, CA (US)

(72) Inventor: Alexandre Naaman, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/182,099

(22) Filed: Feb. 17, 2014

(65) Prior Publication Data

US 2014/0162699 A1 Jun. 12, 2014

Related U.S. Application Data

(63) Continuation of application No. 13/111,908, filed on May 19, 2011, now Pat. No. 8,655,322.

(51) Int. Cl.
*H04M 1/663* (2006.01)
*H04W 4/02* (2009.01)
*H04W 48/14* (2009.01)

(52) U.S. Cl.
CPC .............. *H04W 4/027* (2013.01); *H04W 48/14* (2013.01)

(58) Field of Classification Search
CPC ..... H04W 48/14; H04W 4/027; H04W 48/00; H04W 48/02; H04W 48/04; H04W 48/06; H04W 48/10; H04W 48/08; H04W 48/12; H04W 48/16; H04W 48/17; H04W 48/18; H04W 48/20; H04W 64/00; H04W 64/03
USPC .......... 455/456.4, 412.2, 41.2, 407, 425, 433, 455/435, 566, 500, 436, 99, 442, 444, 450, 455/515, 552.1, 567, 115.3, 297, 456.3, 455/565, 67.11, 68, 414.2, 418, 404.2, 517, 455/414.1, 434; 370/230, 338, 328, 278; 701/424, 445, 213

See application file for complete search history.

(56) References Cited

U.S. PATENT DOCUMENTS 8,467,361 B2 * 6/2013 Luetschwager et al. ...... 370/338
2004/0203698 A1 10/2004 Comp
(Continued)

FOREIGN PATENT DOCUMENTS

TW 200935931 8/2009

OTHER PUBLICATIONS

Apple Support Communities: Choice: Auto connect to unknown WiFi -or-Get unwanted messages every time, Mar. 26, 2011, https:ffdiscussions.apple.com/thread/2784772?start=O&tstart=O, XP002679397, 4 pages. [Retrieved on Jul. 5, 2012].
(Continued)

*Primary Examiner* — Tan H Trinh
(74) *Attorney, Agent, or Firm* — Meyertons, Hood, Kivlin, Kowert & Goetzel, P.C.

(57) ABSTRACT

Disabling wireless access point notifications is described. In some implementations, wireless access point notifications on a mobile device can be disabled when movement of the mobile device is detected. In some implementations, wireless access point notifications on a mobile device can be re-enabled when the mobile device detects that the mobile device has been stationary for a specified period of time following movement of the mobile device. In some implementations, wireless access point notifications can be disabled on a per access point basis.

15 Claims, 6 Drawing Sheets

(56) References Cited

U.S. PATENT DOCUMENTS

| | | | |
|---|---|---|---|
| 2005/0048977 A1 | 3/2005 | Dorenbosch et al. | |
| 2005/0050352 A1* | 3/2005 | Narayanaswami | H04L 63/08 726/4 |
| 2005/0138178 A1 | 6/2005 | Astarabadi | |
| 2005/0255847 A1 | 11/2005 | Han et al. | |
| 2006/0059043 A1* | 3/2006 | Chan | G06Q 30/02 705/14.46 |
| 2006/0059044 A1* | 3/2006 | Chan | G06Q 30/02 705/14.64 |
| 2006/0063540 A1 | 3/2006 | Beuck | |
| 2006/0271485 A1* | 11/2006 | McKenzie | H04L 12/5895 705/51 |
| 2007/0032225 A1 | 2/2007 | Konicek et al. | |
| 2007/0049255 A1 | 3/2007 | Bhakta et al. | |
| 2007/0173266 A1 | 7/2007 | Barnes, Jr. | |
| 2008/0045234 A1 | 2/2008 | Reed | |
| 2008/0062940 A1* | 3/2008 | Othmer et al. | 370/338 |
| 2009/0086672 A1 | 4/2009 | Gholmieh et al. | |
| 2009/0181695 A1 | 7/2009 | Wirola et al. | |
| 2009/0201246 A1* | 8/2009 | Lee et al. | 345/156 |
| 2010/0042248 A1* | 2/2010 | Mylet | 700/214 |
| 2010/0113067 A1 | 5/2010 | Fullam et al. | |
| 2010/0197351 A1* | 8/2010 | Ewell et al. | 455/565 |
| 2010/0269058 A1 | 10/2010 | Othmer et al. | |
| 2011/0021234 A1* | 1/2011 | Tibbitts et al. | 455/517 |
| 2011/0053506 A1* | 3/2011 | Lemke et al. | 455/41.2 |
| 2011/0053572 A1* | 3/2011 | Cook et al. | 455/414.2 |
| 2011/0082746 A1* | 4/2011 | Rice et al. | 705/14.56 |
| 2011/0117856 A1* | 5/2011 | Veluppillai et al. | 455/67.11 |
| 2011/0151853 A1* | 6/2011 | Wang | 455/418 |
| 2011/0176417 A1 | 7/2011 | Kuwabara | |
| 2011/0228753 A1* | 9/2011 | Polito et al. | 370/338 |
| 2011/0244825 A1* | 10/2011 | Ewell, Jr. | 455/404.2 |
| 2012/0046020 A1* | 2/2012 | Tomasini | H04M 1/6075 455/418 |
| 2012/0129545 A1* | 5/2012 | Hodis et al. | 455/456.1 |
| 2012/0196571 A1 | 8/2012 | Grkov et al. | |
| 2012/0290694 A9* | 11/2012 | Marl et al. | 709/223 |
| 2013/0005486 A1 | 1/2013 | Amaitis et al. | |
| 2013/0143596 A1* | 6/2013 | Forstall et al. | 455/456.1 |
| 2013/0250861 A1* | 9/2013 | Luetschwager | H04W 48/16 370/328 |
| 2014/0045477 A1* | 2/2014 | Ewell, Jr. | H04W 4/027 455/418 |
| 2014/0057610 A1* | 2/2014 | Olincy et al. | 455/414.1 |

OTHER PUBLICATIONS

"Is there a way to always ignore a particular wifi network on your iPhone;" Apple Inc., Sep. 3, 2010, retrieved from <http://apple.stackexchange.com/questions/1118/is-there-a-way-to-always-ignore-a-particular-wifi-network-on-your-iphone?rq=1 > on Jan. 16, 2013; 1 page.

"Wi-Fi Ruler;" Android Forums, Phandroid, Aug. 31, 2010, retrieved from <http://androidforunns.com/alpha-beta-testing/164104-wi-fi-ruler.html> on Jan. 16, 2013; pp. 1-3.

International Search Report and Written Opinion in Application No. PCT/US2012/035645, mailed Oct. 26, 2012, pp. 1-7.

U.S. Appl. No. 13/111,908, filed May 19, 2011, Alexandre Naaman.

Office Action from Taiwanese Application No. 101117274, issued Jul. 24, 2014, English and Chinese versions, pp. 1-10.

* cited by examiner

DISABLING ACCESS POINT NOTIFICATIONS

CROSS-REFERENCE TO RELATED APPLICATIONS

This application is a continuation of U.S. Patent Application entitled "Disabling Access Point Notifications," U.S. patent application Ser. No. 13/111,908, filed May 19, 2011, the disclosure of which is herein incorporated by reference in its entirety.

TECHNICAL FIELD

The disclosure generally relates to wireless network detection.

BACKGROUND

Modern mobile computing devices are capable of detecting and connecting to wireless access points for accessing networks, including the internet. These computing devices often provide notifications (e.g., dialog boxes, pop-up windows, etc.) to users when access points are detected. Wireless access point notifications are often displayed to provide the user of the mobile device with a convenient way to identify and connect to wireless access points. However, in some circumstances, wireless access point notifications can be inconvenient and can interfere with the use of mobile computing devices.

SUMMARY

Disabling wireless access point notifications is described. In some implementations, wireless access point notifications on a mobile device can be disabled when movement of the mobile device is detected. In some implementations, wireless access point notifications on a mobile device can be re-enabled when the mobile device detects that the mobile device has been stationary for a specified period of time following movement of the mobile device. In some implementations, movement of the mobile device can be detected based on the strength of wireless access point signals received at the mobile device. In some implementations, movement of the mobile device can be detected based on global positioning system data, motion sensor data, cell tower triangulation, or any other type of location and/or movement determining mechanism.

In some implementations, wireless access point notifications can be disabled on a per access point basis. For example, a user can interact with a wireless access point notification to indicate a wireless access point for which future wireless access point notifications should be disabled.

Particular implementations provide at least the following advantages: wireless access point notifications are dynamically and automatically disabled; wireless access point notifications are prevented from displaying at inconvenient or inappropriate times.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Automatically Disabling Notifications

Figure 1:
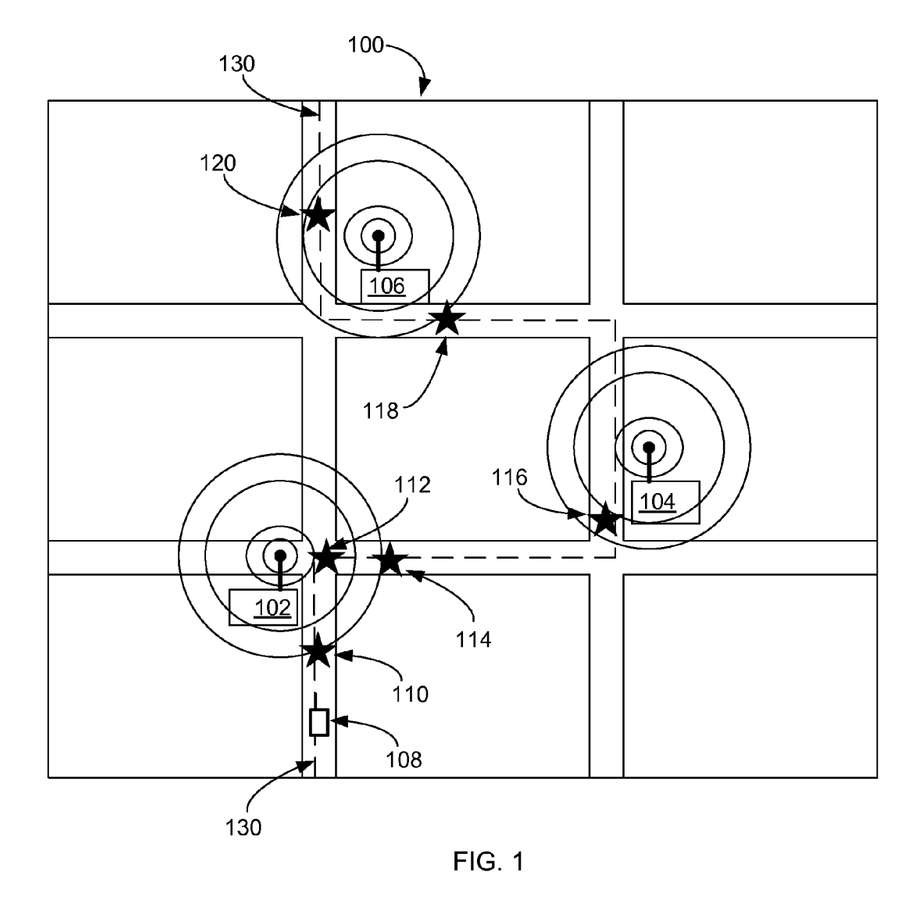
FIG. 1 illustrates an example of a mobile device moving between wireless access points.

FIG. 1 illustrates an example of a mobile device 108 moving between wireless access points 102, 104 and 106 on a city grid 100. For example, mobile device 108 (e.g., a cell phone, smartphone, laptop, etc.) can be moved along path 130. Mobile device 108 can be carried on a person or transported in a vehicle, for example. As mobile device 108 moves along path 130 (e.g., along a street or sidewalk), mobile device 108 can detect wireless access points 102, 104, 106. For example, wireless access points 102, 104 and 106 can correspond to wireless access points provided my various businesses, such as coffee houses, restaurants, bookstores, etc., that mobile device 108 may pass as it travels along path 130.

In some implementations, when mobile device 108 detects a wireless access point, mobile device 108 can present a wireless access point notification. For example, mobile device can display a window or dialog box on a display that indicates that a wireless access point has been detected and identifies (e.g., by name) the wireless access point to the user. In some implementations, the user can provide input to mobile device 108 (e.g., through the displayed wireless access point notification) to cause mobile device 108 to connect, join or associate with the detected wireless access point.

Sometimes, however, a user may not want to connect to wireless access points while the user, and mobile device 108, is moving. For example, a user may be riding in a moving car. The speed at which the car is traveling may not allow for mobile device 108 to stay in range of a stationary wireless access point (e.g., wireless access points 102, 104, 106) for long enough to access data through the wireless access point. For example, by the time the moving mobile device 108 connects to the wireless access point, mobile device 108 may be moving out of range of the wireless access point and be forced to disconnect from the wireless access point.

Moreover, a user of mobile device 108 may be using mobile device 108 while mobile device 108 is moving. For example, a passenger in a moving car may be using a feature or application of mobile device 108. If the passenger/user is repeatedly interrupted by wireless access point notifications while using mobile device 108, the user may get annoyed or frustrated by the interruptions. For example, as mobile device 108 moves from location 110, to location 116, to location 118, to location 120, the mobile device can detect three wireless access points 102, 104, 106 and present three wireless access point notifications. If a user is using mobile device 108 as the mobile device moves from location 110 to location 120, the user will be interrupted with wireless access point notifications three times even though mobile device 108 may not stay within range of any wireless access point for long enough to use the wireless access point.

In some implementations, wireless access point notifications on mobile device 108 can be automatically disabled while mobile device 108 is moving. For example, wireless access point notifications can be disabled when mobile device 108 is moving so that wireless access point notifications will not be presented when a user is unlikely to join detected wireless access points.

In some implementations, movement of mobile device 108 can be detected based on the strength of the signal received from a wireless access point. For example, mobile device 108 can receive signals from wireless access point 102 at locations 110, 112, and 114. At each of the locations 110, 112 and 114 the signal strength of the signal received from wireless access point 102 can change or can have different strengths. For example, the signal strength of the signal received from wireless access point 102 at location 110 can be weaker than the signal strength at location 112. The signal strength of the signal received from wireless access point 102 at location 114 can be weaker than the strength of the signal received at location 112 and weaker than the signal received at location 110. In some implementations, movement of mobile device 108 can be determined based on the strength of the signal received from a wireless access point over a period of time. For example, if the signal strength of a signal from wireless access point 102 received at mobile device 108 is weak at first, then becomes stronger, then becomes weaker, mobile device 108 is likely moving relative to wireless access point 102. The gradual increase in signal strength from location 110 to location 112 can indicate that mobile device 108 is moving closer to wireless access point 102. The gradual decrease in signal strength from location 112 to location 114 can indicate that mobile device 108 is moving away from wireless access point 102.

In some implementations, wireless access point notifications for mobile device 108 can be enabled once mobile device 108 has stopped moving or has become stationary. For example, if a user carrying mobile device 108 stops at a coffee shop that provides wireless access point 104, the user may be more likely to want to connect to the coffee shop's wireless access point 104. Thus, mobile device 108 can be configured to present wireless access point notifications once mobile device 108 has stopped moving.

In some implementations, wireless access point notifications for mobile device 108 can be enabled once mobile device 108 has stopped moving for a configured or specified period of time. For example, if mobile device 108 is moving in a car and the car temporarily stops at a stop light, the user of mobile device 108 is not likely to want to connect to any wireless access points because the car is going to start moving again once the stop light turns green. To prevent presenting notifications during short pauses in movement, mobile device 108 can be configured to enable wireless access point notifications only after mobile device 108 has stopped moving for a configured period of time (e.g., three minutes, five minutes, the duration of a stop light, etc.).

Figure 2:
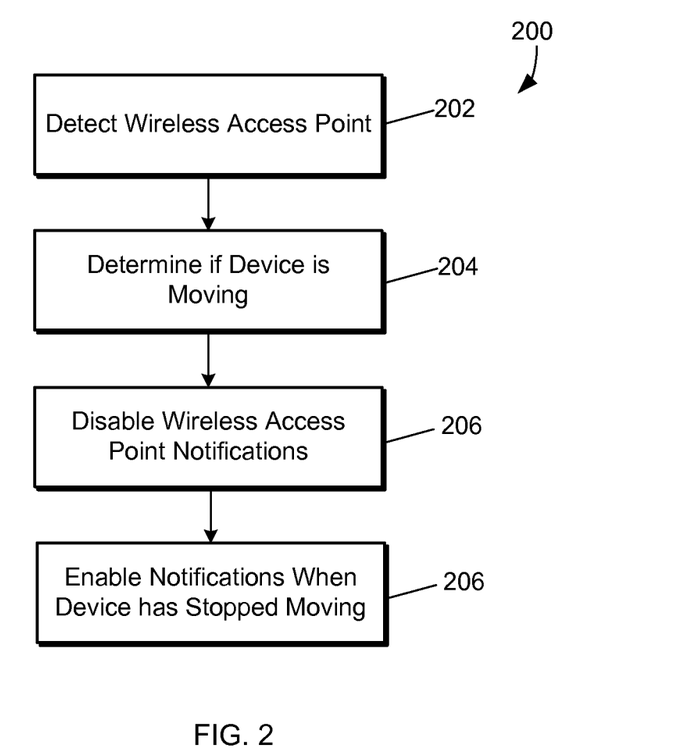
FIG. 2 a flow diagram of an example process for disabling wireless access point notifications.

FIG. 2 a flow diagram of an example process 200 for disabling wireless access point notifications. In some implementations, wireless access point notifications on a mobile device configured to present wireless access point notifications can be automatically disabled based on detected movement of the mobile device. In some implementations, wireless access point notifications on a mobile device can be automatically enabled based on determining that the mobile device has stopped moving.

At step 202, a wireless access point is detected at a mobile device. For example, the wireless access point can be detected by wireless communication subsystem 624 of FIG. 6.

At step 204, a determination is made whether the mobile device is moving. In some implementations, the determination is made based in wireless access point signal strengths, as described above. In some implementations, the determination is made based on global positioning system data, movement sensor data (e.g., accelerometer data), and/or based on location triangulation techniques using signals transmitted from cell towers, wireless access points, or other transmission sources.

At step 206, wireless access point notifications on the mobile device can be disabled when the mobile device is moving. In some implementations, when mobile device 108 determines that mobile device 108 is moving, wireless access point notifications can be disabled on mobile device 108. For example, wireless access point notification popups, windows, dialog boxes, etc. can be prevented from displaying on mobile device 108 while mobile device 108 is moving.

At step 208, wireless access point notifications can be enabled (re-enabled) on the mobile device when the mobile device has stopped moving. In some implementations, mobile device 108 can determine when mobile device 108 has stopped moving. For example, the same techniques for detecting movement described at step 204 can be used to determine when mobile device 108 has stopped moving. In some implementations, mobile device 108 can determine when mobile device 108 has stopped moving for a configured period of time. For example, mobile device 108 can store data indicating a period of time that the mobile device needs to be stationary before wireless access points are enabled on mobile device 108. Once mobile device 108 determines that mobile device 108 has stopped moving, mobile device 108 can wait the configured period of time before enabling wireless access point notifications on mobile device 108.

Manually Disabling Individual Notifications

Figure 3A:
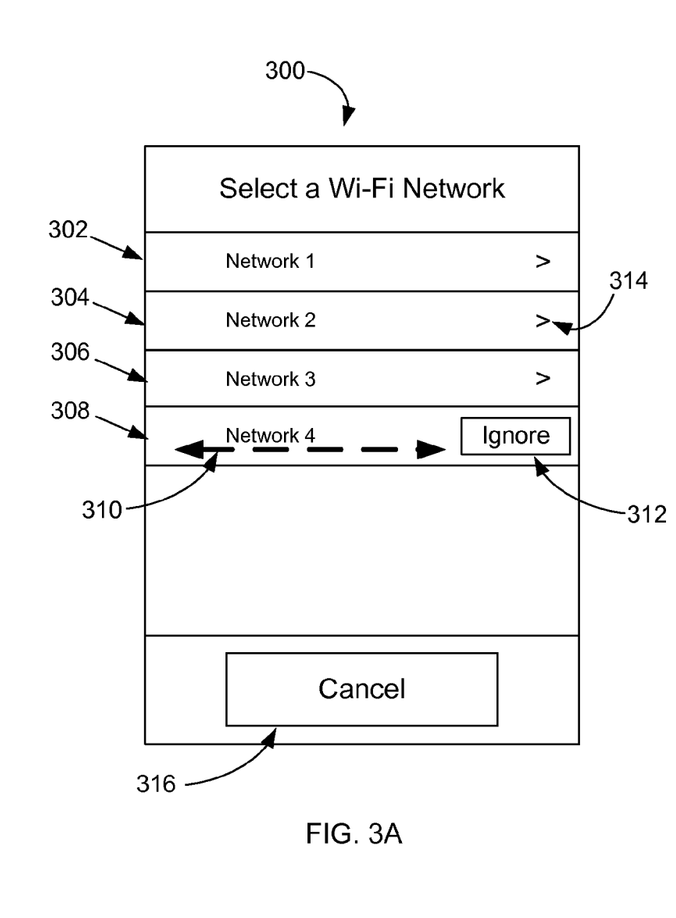
FIGS. 3A and 3B illustrate example interfaces for disabling individual wireless access point notifications.

FIG. 3A illustrates example interface 300 for disabling individual wireless access point notifications. For example, a mobile device can be configured to present wireless access point notifications when the mobile device detects a wireless access point. In some implementations, detected wireless access points can be displayed on interface 300. For example, interface 300 can present graphical elements 302, 304, 306 and 308 on interface 300 for displaying information related to detected wireless access points. For example, graphical elements 302-308 can each be associated with a corresponding wireless access point and present information for the wireless access point, such as display names associated with wireless access points, security information (e.g., encryption algorithms, password requirements, etc.), and signal strength.

In some implementations, a user can interact with graphical elements 302-308 to disable wireless access point notifications for particular wireless access points. For example, if interface 300 is presented on a touch-sensitive display (e.g., touch screen 646 of FIG. 6), a user may slide a finger along graphical element 308 as indicated by dashed line 310 to cause graphical element 312 to display. In some implementations, graphical element 312 can be selected by a user to disable wireless access point notifications for the wireless access point associated with graphical element 308. For example, when a user selects graphical element 312, information can be stored on the mobile device that indicates that wireless access point notification should not be presented when the wireless access point corresponding to graphical element 308 is detected in the future.

Figure 3B:
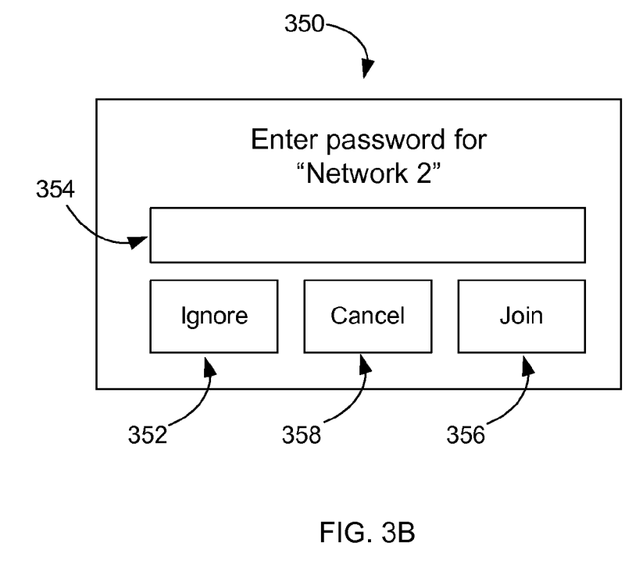

In some implementations, a user can select graphical element 312 to present options for the wireless access point corresponding to graphical element 304. For example, if a user selects graphical element 312, interface 350 can be displayed on the mobile device.

FIG. 3B illustrates example interface 350 for disabling individual wireless access point notifications. In some implementations, a user can provide input to interface 350 to disable wireless access point notifications for the wireless access point associated with user interface 350. In some implementations, a user can select graphical element 352 to disable future wireless access point notifications for the wireless access point associated with interface 350.

In some implementations, a user can input authentication information into graphical element 354. For example, some wireless access points can require a user or device to be authorized to access the wireless access point. A user can provide authentication information (e.g., a password, key, etc.) through graphical element 354. Once the user has provided the authentication information, the user can select graphical element 356 to join or connect to the wireless access point. If a user does not want to connect to the wireless access point, the user can select graphical element 358 to close interface 350 without connecting to the wireless access point.

Figure 4:
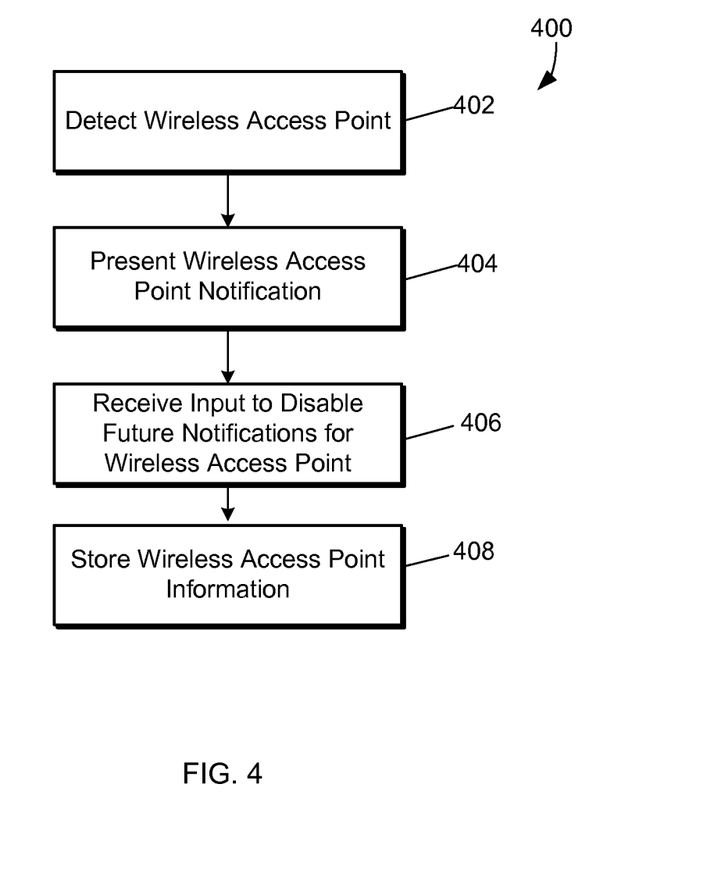
FIG. 4 is flow diagram of an example process for disabling individual wireless access point notifications.

FIG. 4 is flow diagram of an example process for disabling individual wireless access point notifications. At step 402, a wireless access point is detected at a mobile device. For example, wireless communication subsystem 624 of FIG. 6 can detect wireless access points that are reachable by the mobile device.

At step 404, a wireless access point notification is presented. For example, in response to detecting wireless access points, the mobile device can present a wireless access point notification identifying some or all of the wireless access points that are reachable by the mobile device. The wireless access point notification can also provide information identifying the wireless access point, indicating the strength of the signal received from the wireless access point and/or authentication requirements.

At step 406, input is received to disable future notifications for a wireless access point. For example, a user can disable future wireless access point notifications for selected wireless access points, as described above with reference to FIGS. 3A and 3B.

At step 408, wireless access point information can be stored for disabled wireless access points. For example, the mobile device can maintain a database (e.g., access point notification database 674 of FIG. 6) of wireless access points for which a user has disabled future wireless access point notifications. In some implementations, when input is received from a user indicating that the user does not wish to receive future wireless access point notifications for a particular wireless access point, identification information for the particular wireless access point (e.g., a name, service set identifier (SSID), media access control (MAC) address, etc.) can be stored in the database. For example, the database can be referenced when wireless access points are detected to determine which wireless access points should generate wireless access point notifications.

Figure 5:
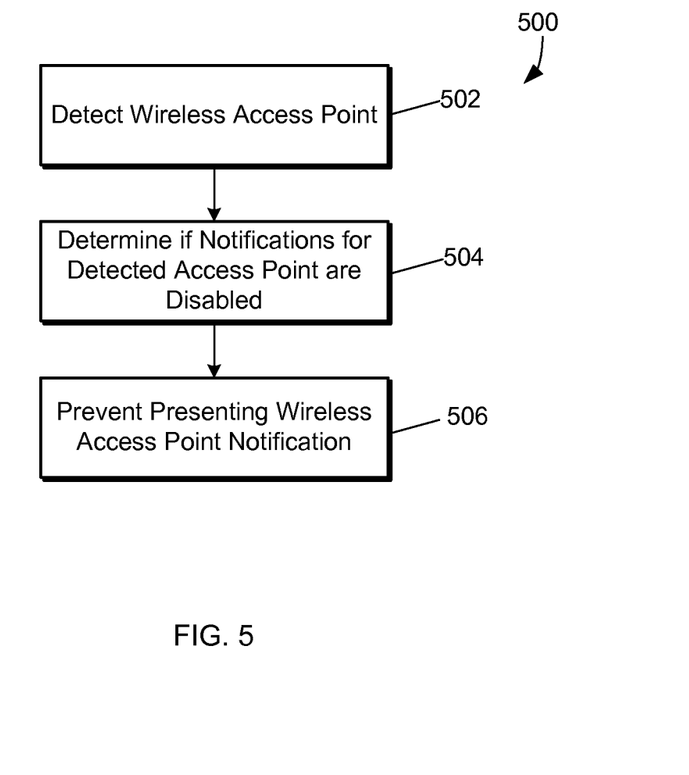
FIG. 5 is a flow diagram of an example process for preventing wireless access point notifications.

FIG. 5 is a flow diagram of an example process 500 for preventing wireless access point notifications. At step 502, wireless access points are detected at a mobile device. For example, wireless communication subsystem 624 of FIG. 6 can detect wireless access points that are reachable by the mobile device.

At step 504, the mobile device can determine if notifications for the detected wireless access points are disabled. In some implementations, mobile device can compare information associated with the detected wireless access points (e.g., names, SSIDs, MAC addresses, etc.) to information stored in a wireless access point database to determine if wireless access point notifications are disabled for the detected wireless access points. For example, if a detected wireless access point is identified in the database or if the database indicates that notifications for the detected wireless access point have been disabled, then wireless access point notifications should not be generated for the detected wireless access point.

At step 506, the mobile device can prevent wireless access point notifications from being presented for identified wireless access points. For example, if step 504 determines that notifications for a detected wireless access point were disabled, then a wireless access point notification will not be generated for the detected wireless access point. In some implementations, wireless access point notifications can be generated for some detected wireless access points and not for other detected wireless access points. For example, a detected wireless access point for which notifications were disabled will not appear in the listing of wireless access points on interface 3A while a detected wireless access point for which notifications were not disabled may generate a wireless access point notification and appear in the wireless access point listing of interface 300.

Example Mobile Device Architecture

Figure 6:
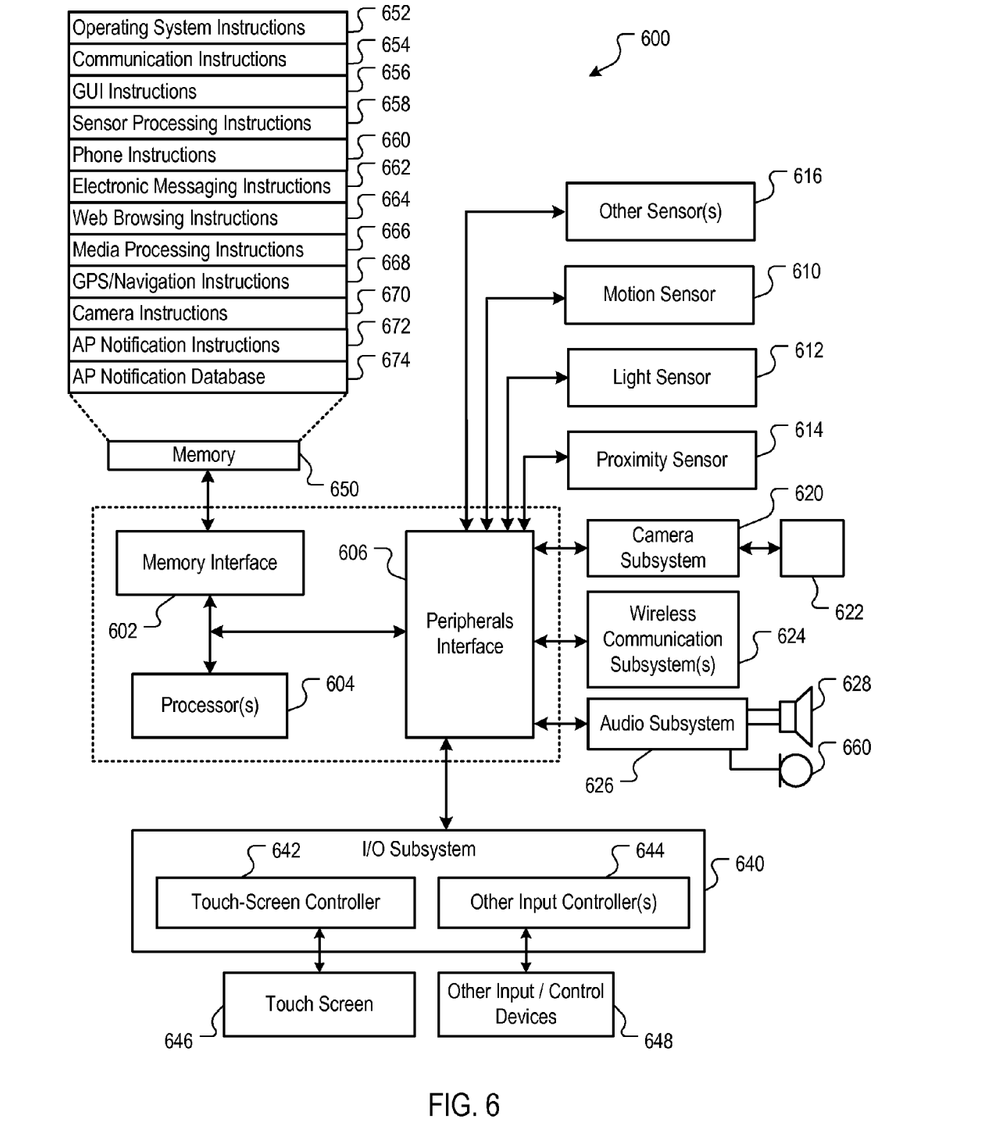
FIG. 6 is a block diagram of an exemplary system architecture implementing the features and processes of FIGS. 1-5.

FIG. 6 is a block diagram 600 of an example implementation of the mobile device 100 of FIGS. 1-5. The mobile device 100 can include a memory interface 602, one or more data processors, image processors and/or central processing units 604, and a peripherals interface 606. The memory interface 602, the one or more processors 604 and/or the peripherals interface 606 can be separate components or can be integrated in one or more integrated circuits. The various components in the mobile device 100 can be coupled by one or more communication buses or signal lines.

Sensors, devices, and subsystems can be coupled to the peripherals interface 606 to facilitate multiple functionalities. For example, a motion sensor 610, a light sensor 612, and a proximity sensor 614 can be coupled to the peripherals interface 606 to facilitate orientation, lighting, and proximity functions. Other sensors 616 can also be connected to the peripherals interface 606, such as a positioning system (e.g., GPS receiver), a temperature sensor, a biometric sensor, or other sensing device, to facilitate related functionalities.

A camera subsystem 620 and an optical sensor 622, e.g., a charged coupled device (CCD) or a complementary metal-oxide semiconductor (CMOS) optical sensor, can be utilized to facilitate camera functions, such as recording photographs and video clips. The camera subsystem 620 and the optical sensor 622 can be used to collect images of a user to be used during authentication of a user, e.g., by performing facial recognition analysis.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which the mobile device 100 is intended to operate. For example, a mobile device 100 can include communication subsystems 624 designed to operate over a GSM network, a GPRS network, an EDGE network, a Wi-Fi or WiMax network, and a Bluetooth™ network. In particular, the wireless communication subsystems 624 can include hosting protocols such that the device 100 can be configured as a base station for other wireless devices. In some implementations, wireless communication subsystem can detect wireless access points, detect signal strengths of wireless access points and support other features described with reference to FIGS. 1-5.

An audio subsystem 626 can be coupled to a speaker 628 and a microphone 630 to facilitate voice-enabled functions, such as speaker recognition, voice replication, digital recording, and telephony functions. The I/O subsystem 640 can include a touch screen controller 642 and/or other input controller(s) 644. The touch-screen controller 642 can be coupled to a touch screen 646. The touch screen 646 and touch screen controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 646.

The other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of the speaker 628 and/or the microphone 630.

In one implementation, a pressing of the button for a first duration can disengage a lock of the touch screen 646; and a pressing of the button for a second duration that is longer than the first duration can turn power to the mobile device 100 on or off. Pressing the button for a third duration can activate a voice control, or voice command, module that enables the user to speak commands into the microphone 630 to cause the device to execute the spoken command. The user can customize a functionality of one or more of the buttons. The touch screen 646 can, for example, also be used to implement virtual or soft buttons and/or a keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 can, therefore, include a 36-pin connector that is compatible with the iPod. Other input/output and control devices can also be used.

The memory interface 602 can be coupled to memory 650. The memory 650 can include high-speed random access memory and/or non-volatile memory, such as one or more magnetic disk storage devices, one or more optical storage devices, and/or flash memory (e.g., NAND, NOR). The memory 650 can store an operating system 652, such as Darwin, RTXC, LINUX, UNIX, OS X, WINDOWS, or an embedded operating system such as VxWorks.

The operating system 652 can include instructions for handling basic system services and for performing hardware dependent tasks. In some implementations, the operating system 652 can be a kernel (e.g., UNIX kernel). In some implementations, the operating system 652 can include instructions for performing voice authentication. For example, operating system 652 can implement the features as described with reference to FIGS. 1-5.

The memory 650 can also store communication instructions 654 to facilitate communicating with one or more additional devices, one or more computers and/or one or more servers. The memory 650 can include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes and instructions; and/or camera instructions 670 to facilitate camera-related processes and functions.

The memory 650 can store access point (AP) notification instructions 672 to facilitate the processes and functions described with reference to FIGS. 1-5. For example, the software instructions can include instructions for performing voice authentication on a per application or per feature basis and for allowing a user to configure authentication requirements of each application or feature available on device 100. Memory 650 can store an access point notification database for storing information related to access points, such as the access point notification information stored and used with respect to the processes described with reference to FIGS. 1-5.

The memory 650 can also store other software instructions (not shown), such as web video instructions to facilitate web video-related processes and functions; and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 650 can include additional instructions or fewer instructions. Furthermore, various functions of the mobile device 100 can be implemented in hardware and/or in software, including in one or more signal processing and/or application specific integrated circuits.

What is claimed is:

1. A method comprising:
    detecting a wireless access point at a device configured to present wireless access point notifications, wherein each presented wireless access point notification indicates that a respective wireless access point has been wirelessly detected and identifies the respective wireless access point;
    determining whether the device is moving; and
    disabling wireless access point notifications when the device is moving, wherein one or more other user interface features remain enabled when the device is moving, where the method is performed by one or more processors.

2. The method of claim 1, further comprising determining whether the device is moving based on a global position system signal.

3. The method of claim 1, further comprising:
    receiving a signal from the wireless access point;
    determining a strength of the signal; and
    determining whether the device is moving based on the strength of the signal.

4. The method of claim 1, further comprising:
    detecting that the device has stopped moving;
    determining whether the device has been stationary for a configured period of time; and
    enabling wireless access point notifications when the device has been stationary for the configured period of time.

5. The method of claim 1, further comprising:
    detecting that the device has stopped moving; and enabling wireless access point notifications in response to the detecting that the device has stopped moving.

6. A non-transitory computer-readable medium including one or more sequences of instructions which, when executed by one or more processors, causes:
   detecting a wireless access point at a device configured to present wireless access point notifications, wherein each presented wireless access point notification indicates that a respective wireless access point has been wirelessly detected and identifies the respective wireless access point;
   determining whether the device is moving; and
   disabling wireless access point notifications when the device is moving, wherein one or more other user interface features remain enabled when the device is moving.

7. The non-transitory computer-readable medium of claim 6, wherein the instructions include instructions that cause determining whether the device is moving based on a global position system signal.

8. The non-transitory computer-readable medium of claim 6, wherein the instructions include instructions that cause:
   receiving a signal from the wireless access point;
   determining a strength of the signal; and
   determining whether the device is moving based on the strength of the signal.

9. The non-transitory computer-readable medium of claim 6, wherein the instructions include instructions that cause:
   detecting that the device has stopped moving;
   determining whether the device has been stationary for a configured period of time; and
   enabling wireless access point notifications when the device has been stationary for the configured period of time.

10. The non-transitory computer-readable medium of claim 6, wherein the instructions include instructions that cause:
    detecting that the device has stopped moving; and
    enabling wireless access point notifications in response to the detecting that the device has stopped moving.

11. A system comprising:
    at least one processor; and
    a computer-readable medium including one or more sequences of instructions which, when executed by the at least one processor, causes:
       detecting a wireless access point at a device configured to present wireless access point notifications, wherein each presented wireless access point notification indicates that a respective wireless access point has been wirelessly detected and identifies the respective wireless access point;
       determining whether the device is moving; and
       disabling wireless access point notifications when the device is moving, wherein one or more other user interface features remain enabled when the device is moving.

12. The system claim 11, wherein the instructions include instructions that cause determining whether the device is moving based on a global position system signal.

13. The system of claim 11, wherein the instructions include instructions that cause:
    receiving a signal from the wireless access point;
    determining a strength of the signal; and
    determining whether the device is moving based on the strength of the signal.

14. The system of claim 11, wherein the instructions include instructions that cause:
    detecting that the device has stopped moving;
    determining whether the device has been stationary for a configured period of time; and
    enabling wireless access point notifications when the device has been stationary for the configured period of time.

15. The system of claim 11, wherein the instructions include instructions that cause:
    detecting that the device has stopped moving; and
    enabling wireless access point notifications in response to the detecting that the device has stopped moving.

* * * * *